United States Patent
Luo et al.

(10) Patent No.: US 12,430,866 B1
(45) Date of Patent: Sep. 30, 2025

(54) DYNAMIC PIFu ENROLLMENT

(71) Applicant: Apple Inc., Cupertino, CA (US)

(72) Inventors: Ran Luo, San Jose, CA (US); Olivier Soares, Oakland, CA (US); Andrew R. Harvey, San Jose, CA (US)

(73) Assignee: Apple Inc., Cupertino, CA (US)

( * ) Notice: Subject to any disclaimer, the term of this patent is extended or adjusted under 35 U.S.C. 154(b) by 204 days.

(21) Appl. No.: 18/470,046

(22) Filed: Sep. 19, 2023

Related U.S. Application Data

(60) Provisional application No. 63/376,378, filed on Sep. 20, 2022.

(51) Int. Cl.

| G06T 7/00 | (2017.01) |
|---|---|
| G06T 7/62 | (2017.01) |
| G06T 7/73 | (2017.01) |
| G06T 17/20 | (2006.01) |
| G06T 19/20 | (2011.01) |
| G06V 10/764 | (2022.01) |
| G06V 10/77 | (2022.01) |
| G06V 10/80 | (2022.01) |
| G06V 10/86 | (2022.01) |

(52) U.S. Cl.
CPC .......... *G06T 19/20* (2013.01); *G06T 7/62* (2017.01); *G06T 7/73* (2017.01); *G06T 17/20* (2013.01); *G06V 10/764* (2022.01); *G06V 10/7715* (2022.01); *G06V 10/809* (2022.01); *G06V 10/86* (2022.01); *G06T 2207/30201* (2013.01); *G06T 2219/2021* (2013.01)

(58) Field of Classification Search
None
See application file for complete search history.

(56) References Cited

U.S. PATENT DOCUMENTS

| 10,776,609 B2* | 9/2020 | Kolagunda | G06V 40/45 |
|---|---|---|---|
| 11,295,532 B2* | 4/2022 | Li | G06V 20/20 |
| 11,645,756 B2* | 5/2023 | Kao | G06T 7/168 |
| | | | 382/154 |
| 2016/0300100 A1* | 10/2016 | Shen | G06V 40/67 |
| 2018/0089505 A1* | 3/2018 | El-Khamy | G06N 3/045 |
| 2018/0330194 A1* | 11/2018 | Peng | G06V 10/454 |
| 2019/0266388 A1* | 8/2019 | Kolagunda | G06V 20/647 |
| 2020/0184252 A1* | 6/2020 | Syeda-Mahmood | G06V 10/26 |
| 2020/0302149 A1* | 9/2020 | Gottemukkula | G06N 3/084 |
| 2020/0357143 A1* | 11/2020 | Chiu | G06F 18/253 |
| 2021/0279892 A1* | 9/2021 | Zhan | G06F 18/254 |
| 2022/0084270 A1* | 3/2022 | Zhang | G06N 3/088 |

* cited by examiner

*Primary Examiner* — Martin Mushambo
(74) *Attorney, Agent, or Firm* — Blank Rome LLP

(57) ABSTRACT

Generating a 3D representation of a subject includes obtaining a set of images of a subject. For each sample point, a classifier value is obtained based on each image. The classifier value indicates a relationship of the sample point to an interior or exterior of a volume of the subject. In addition, deformation data is determined for the subject across the image. The classifier values are fused based on the deformation data, and a 3D occupation field is determined for the subject based on the fused classifier values.

20 Claims, 8 Drawing Sheets

DYNAMIC PIFu ENROLLMENT

BACKGROUND

Computerized characters that represent users are commonly referred to as avatars. Avatars may take a wide variety of forms including virtual humans, animals, and plant life. Existing systems for avatar generation tend to inaccurately represent the user, require high-performance general and graphics processors, and generally do not work well on power-constrained mobile devices, such as smartphones or computing tablets.

DETAILED DESCRIPTION

Figure 1:
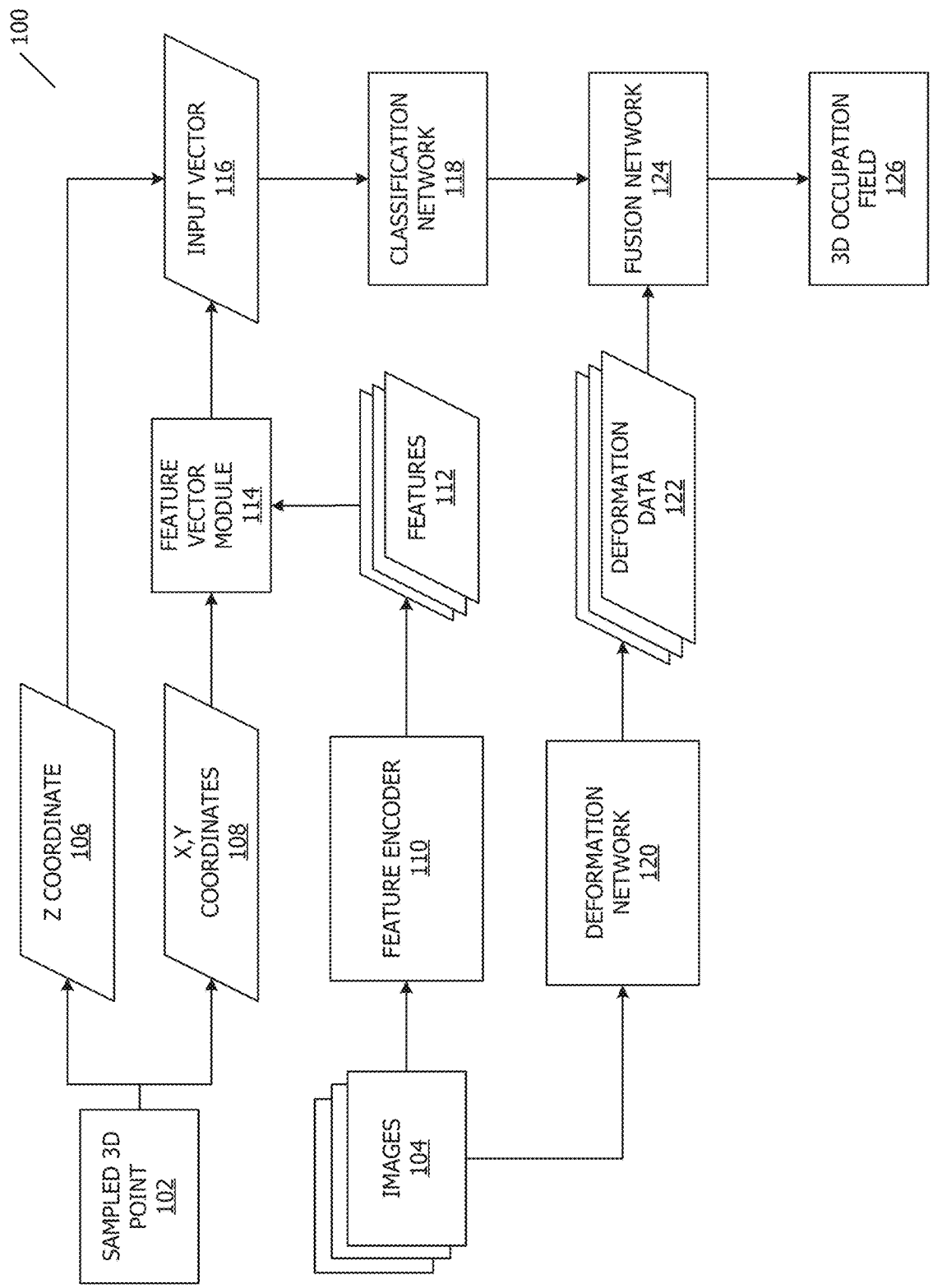
FIG. 1 shows a flow diagram for generating a 3D occupation field, according to some embodiments.

This disclosure relates generally to techniques for enhanced enrollment for avatar generation. More particularly, but not by way of limitation, this disclosure relates to techniques and systems for capturing a volume of a subject to get a reconstruction mesh.

This disclosure pertains to systems, methods, and computer readable media to determine a 3D shape of a subject based on multiple images of the subject from a variety of points of view. According to some embodiments, an input image is applied to a feature network, such as an image encoder, to obtain surface features for the subject. By sampling a given feature point of the image, a feature vector can be obtained. Then, given the feature vector, and a given depth value, a classification network can predict whether the given point (e.g., the x,y coordinates of the sampled feature point, plus the given z coordinate) is inside or outside the volume of the subject. By doing so for all 3D points, the surface of the volume can be recovered, for example using a marching cube algorithm.

In some embodiments, the process is applied to a set of images of a user from different viewpoints, for example during an enrollment session. Because the feature points are in different locations across the images, a technique is applied to determine, for each feature, corresponding pixels across the images. In some embodiments, the relative position of the feature across images may be represented in the form of a deformation graph, from which deformation can be identified. That deformation data may be combined with the classification data for each set of corresponding pixels for a feature to determine an improved classification for a given feature. From the improved feature classification data, an improved 3D occupation field may be determined for the subject.

Embodiments described herein improve a technique for determining a 3D occupation field from 2D images by utilizing deformation data to determine corresponding features across images, thereby improving performance of a classification of a feature in 3D space and, thus, reconstruction of the 3D subject from 2D images of the subject.

In the following description, for purposes of explanation, numerous specific details are set forth in order to provide a thorough understanding of the disclosed concepts. As part of this description, some of this disclosure's drawings represent structures and devices in block diagram form in order to avoid obscuring the novel aspects of the disclosed embodiments. In this context, it should be understood that references to numbered drawing elements without associated identifiers (e.g., 100) refer to all instances of the drawing element with identifiers (e.g., 100a and 100b). Further, as part of this description, some of this disclosure's drawings may be provided in the form of a flow diagram. The boxes in any particular flow diagram may be presented in a particular order. However, it should be understood that the particular flow of any flow diagram is used only to exemplify one embodiment. In other embodiments, any of the various components depicted in the flow diagram may be deleted, or the components may be performed in a different order, or even concurrently. In addition, other embodiments may include additional steps not depicted as part of the flow diagram. The language used in this disclosure has been principally selected for readability and instructional purposes and may not have been selected to delineate or circumscribe the disclosed subject matter. Reference in this disclosure to "one embodiment" or to "an embodiment" means that a particular feature, structure, or characteristic described in connection with the embodiment is included in at least one embodiment, and multiple references to "one embodiment" or to "an embodiment" should not be understood as necessarily all referring to the same embodiment or to different embodiments.

It should be appreciated that in the development of any actual implementation (as in any development project), numerous decisions must be made to achieve the developers' specific goals (e.g., compliance with system and business-related constraints) and that these goals will vary from one implementation to another. It will also be appreciated that such development efforts might be complex and time consuming but would nevertheless be a routine undertaking for those of ordinary skill in the art of image capture having the benefit of this disclosure.

Turning to FIG. 1, a flow diagram is shown for generating a 3D occupation field based on a set of input images, according to some embodiments. For purposes of explanation, the following steps will be described in the context of the components presented in FIG. 1. However, it should be understood that the various actions may be performed by alternate components. In addition, the various actions may be performed in a different order. Further, some actions may be performed simultaneously, and some may not be required, or others may be added.

The flow diagram 100 begins with input images 104. The input images 104 may be images of a user or other subject, and may be captured from multiple points of view. In addition, in some embodiments, the images 104 may capture the subject in different poses, for example if the user or subject moves or changes position while the series of images are captured. In some embodiments, the images 104 may be captured, for example, during an enrollment period in which a user utilizes a personal device to capture images of the user's face from which enrollment data may be captured for rendering avatar data associate with the user. In some instances, the device will capture images of the user's face from different points of view. In addition, the user may move between image frames, such that the captured images are not only from different perspectives between the camera and the user, but include the user in different poses, making different expressions, or the like.

According to one or more embodiments, the images 104 may be applied to a feature encoder 110 to obtain a set of features 112 for each of the images 104. In one or more embodiments, the feature encoder 112 configured to provide feature vectors for a given pixel in an image. A given sampled 3D point in space 102 will have X, Y, and Z coordinates. From the X, Y coordinates, a feature vector is selected from among the features 112 of the images. In some embodiments, a feature vector may be selected, for example by feature vector module 114 for each of the input images 104. As an example, if three input images are used at images 104, then, for a given sampled 3D point 102, three feature vectors will be obtained by feature vector module 114 (e.g., a feature vector for each input image at the X, Y coordinates). In some embodiments each of the feature vectors are combined with the corresponding Z coordinate 106 for the given sampled 3D point 102, to obtain an input vector 116 for the sampled 3D point at each image. In some embodiments, the input vectors 116 include, for each image, a concatenation of the feature vector for the image, along with the Z coordinate value. The process may be performed for each of a set of sampled 3D points for a 3D region of space associated with the images.

According to one or more embodiments, the input vectors 116 may be applied to a classification network 118 to determine a classification value for the particular sampled 3D point for each input vector. For example, returning to the example of 3 input images 104, for a given sampled 3D point, a classification value may be determined for each image (i.e., 3 classification values). In some embodiments, the classification network may be trained to predict a relation of a sampled point to the surface of the subject presented in the input images 104. For example, in some embodiments, the classification network 118 may return a value between 0-1, where 0.5 is considered to be on a surface, and 1 and 0 are considered to be inside and outside, respectively, the 3D volume of the subject delineated by the surface. Accordingly, for each sampled 3D point across the input images, a classification value is determined.

In some embodiments, the input images 104 may be applied to a deformation network 120 to determine deformation data 122. The deformation data may indicate a spatial relationship between a set of feature points from a source image of the input images 104 to one of the additional input images 104. According to some embodiments, the deformation network 120 may be configured to identify landmark points on the subject in each of the images and, from the set of landmarks, determining a deformation graph indicating a relative position of each of the set of landmark points from the source image to the additional image in the input images 104. The deformation graph may be indicative of deformation data that is indicative, for a landmark point, 12 degrees of freedom for indicating the transformation from the source image to the additional image of the input images 104.

According to one or more embodiments, the deformation data 122 and the classification values from classification network 118 may be applied to a fusion network 124, which is trained to fuse the classification values for each 3D sample point across the image to determine a fused classification value for a given 3D point in space by considering the spatial relationship in the points in the images using the deformation data 112. For example, a particular landmark point from a given input image 104 may be associated with a particular classification value. That classification value can be improved by considering the classification value for the same landmark point on the subject captured in a different input image 104. However, in order to identify correspondences of 3D sample points across the images, the deformation data may be considered. As such, the fusion network 124 can take the deformation data 122 and the classification values from classification network 118 to determine a set of classification values for a 3D space representative of the 3D sample points. From there, a 3D occupation field 126 may be determined based on the classification values. For example, the set of fused classification values may be analyzed to recover a surface of the 3D subject presented in the input images. In some embodiments, this 3D occupation field may then be used for generating representations of the user, or part of the user, such as avatar representations of the user.

Figure 2:
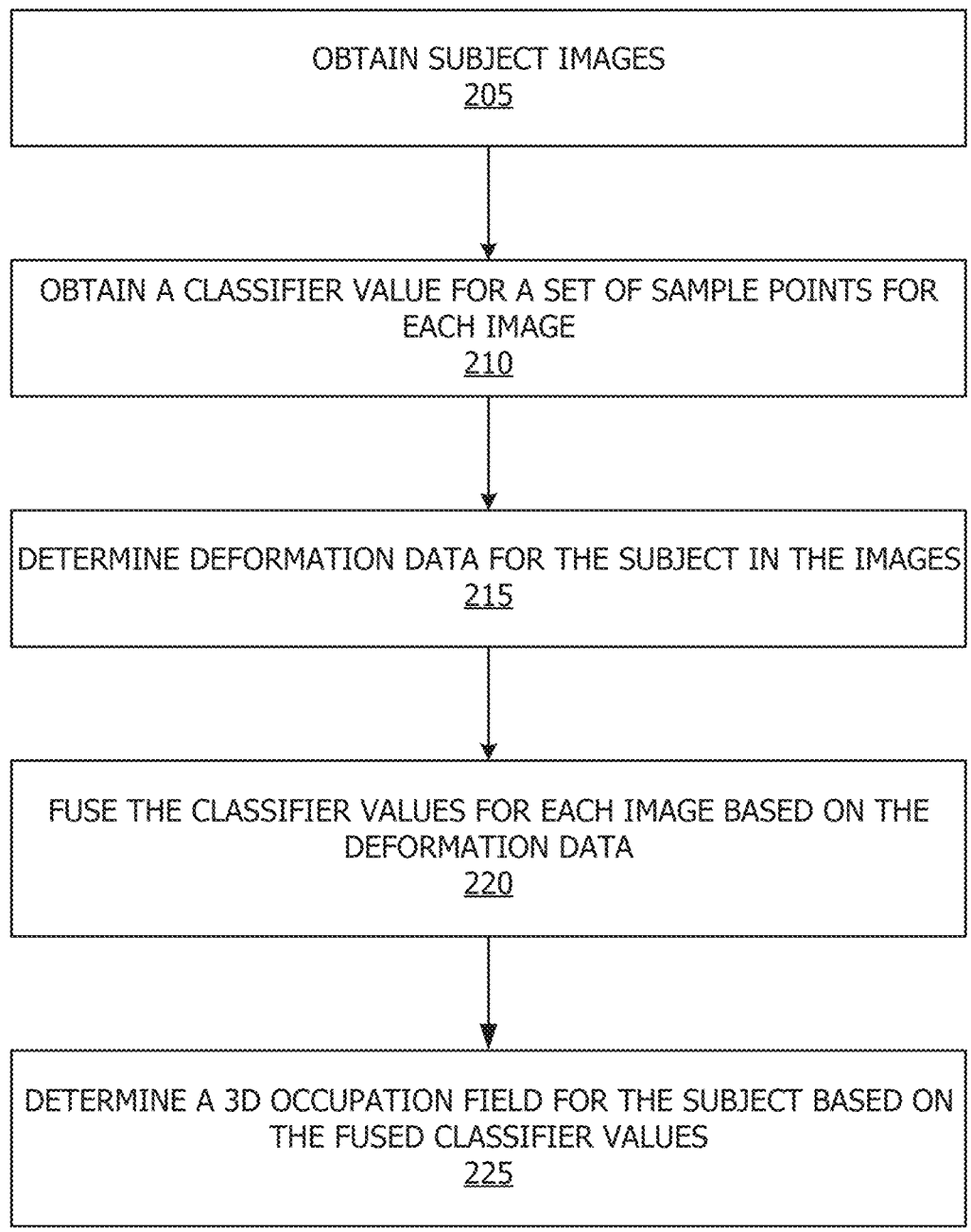
FIG. 2 shows a flowchart of a technique for determining a 3D occupation field for a subject depicted in a set of images, according to one or more embodiments.

FIG. 2 shows a flowchart of a technique for determining a 3D occupation field for a subject depicted in a set of images, according to one or more embodiments. For purposes of explanation, the following steps will be described in the context of FIG. 1. However, it should be understood that the various actions may be performed by alternate components. In addition, the various actions may be performed in a different order. Further, some actions may be performed simultaneously, and some may not be required, or others may be added.

The flowchart 200 begins at block 205 where images of a subject are obtained. As described above, the input images may be images of a user or other subject, and may be captured from multiple points of view. For example, a subject can be captured in a series of images from different angles. That is, the user or subject may move or change poses while a camera is capturing still images, or a camera can move with respect to the user, or some combination thereof. For example, a first frame may capture the user from a first point of view while the user is in a first pose, while a second frame captures the user from a second point of view and from a second pose, where the user has move from the first pose to the second pose between the capture of the first frame and the second frame. As such, embodiments described herein do not require a user to stay still, or limit movement while images are captured. The images may be 2D images in some embodiments. The images may be collected by one or more cameras on or operatively connected to a user device.

The flowchart 200 continues at block 210 where a classifier value is obtained for a set of sample points for each image. As described above, the sample points may refer to a 3D point corresponding to a 3D region in which the subject is to be represented. In some embodiments, the classifier value may be associated with a volume of the subject. For example, the classifier value may indicate a predicted relative position of the 3D sample point to the surface of the subject. In some embodiments, pixel-aligned implicit functions ("PIFu") may be used to obtain the classifier value for each sample points, from each image. As such, the classifier may be trained to predict a classifier value based on a feature vector, which may include a feature vector from a pixel associated with the X, Y coordinate of a given sample point, as well as a z value indicative of depth of the space in which the volume of the subject is to be represented.

At block 215, deformation data is determined for the subject in the images. In some embodiments, the subject need not stay still or limit their movement. As such, the subject may turn, stretch, change expression or pose across the set of images collected at 205. In some embodiments, a deformation graph may be determined for each of the images based on locations of landmarks in the images. According to one or more embodiment, the deformation graph for each image may be based on a relative location of landmarks on the surface of the subject, such as particular keypoints on a face of a user represented in the images. A particular image may be selected as a source image. For example, an image of a face in a neutral position may be selected as the source image. Then the deformation graph of the source image is aligned to the additional image to determine a deformation graph for the additional image. In some embodiments, the deformation data may include a relative portion of each of the set of landmark points from the first image to the second image. In some embodiments, the relative position may be expressed using 12 degrees of freedom.

The flowchart continues to block 220 where the classifier values for the ample points determined at 210 are fused based on the deformation data. Because the deformation data indicates correspondences between landmark points across images, the deformation data can be used to predict, for a given pixel on a source image, a corresponding pixel on a destination image given the deformation data for the destination image. As such, for a pixel on one image, a corresponding pixel can be identified on the remaining input images. The classifier values for each of the corresponding pixels can then be combined to determine a combined classifier value. The classifier values may be combined in any number of ways. For example, the values may be averaged, or weighted against each other based on various parameters related to the image, the capture of the image, and/or content in the image.

The flowchart 200 concludes at block 225 where a 3D occupation field is determined for the subject based on the fused classifier values. In some embodiments, the classifier values indicate a relative location of the 3D point to the volume of the subject. As such, values that indicate a location of the surface of the subject can indicate a boundary of the volume of the subject. Accordingly, a 3D occupation field can be determined based on the 3D points in space determined to be inside the volume of the subject, and/or the 3D points in space that are determined to lie on or near the boundary of the subject.

Figure 3:
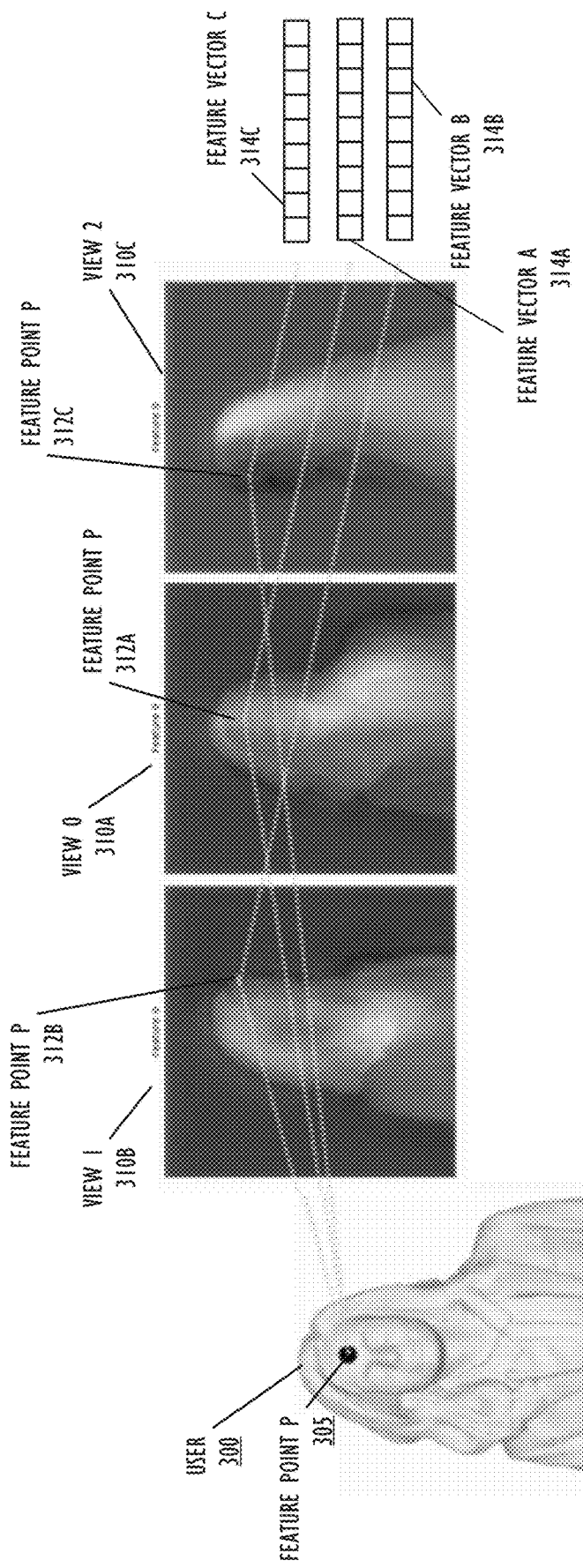
FIG. 3 shows a diagram of a technique for determining a feature vector for a feature point in accordance with some embodiments.

FIG. 3 shows a diagram of a technique for determining a feature vector for a feature point in accordance with some embodiments. Specifically, FIG. 3 shows a 3D representation of a user 300 for which a feature vector is determined. In particular, the user 300 is captured from different views, as shown by view zero 310A, view 1 310B, and view 2 210C. The feature vector may be determined for feature point across each of the images. According to one or more embodiments, the images 310 may be applied to a feature encoder to obtain a set of features vectors for each of the images 310.

Feature point P 305 is representative of an example feature point for which corresponding feature points are identified in the images 310. While the corresponding feature points in each of the images may not be readily available, as will be described in greater detail below, the corresponding feature points are identifiable based on deformation data. However, the feature vectors for the feature points are provided among the set of feature vectors for each of the images 310. For purposes of this example, a corresponding point for the feature point P 305 is shown in each of the images. This is shown in view 0 310A as feature point P 312A, in view 1 310B as feature point P 312B, and in view 2 310C as feature point P 312C. Each of these feature points is associated with a feature vector. For example, feature point P 312A is associated with feature vector A 314A. Similarly, feature point P 312B is associated with feature vector B 314B, and feature point P 312C is associated with feature vector C 314C. Once determined that these 3 feature vectors correspond to a same feature point P 305, for example through applying a deformation model, then the combined feature vectors can be applied to a classifier to obtain a prediction for the feature point P 305.

Figure 4:
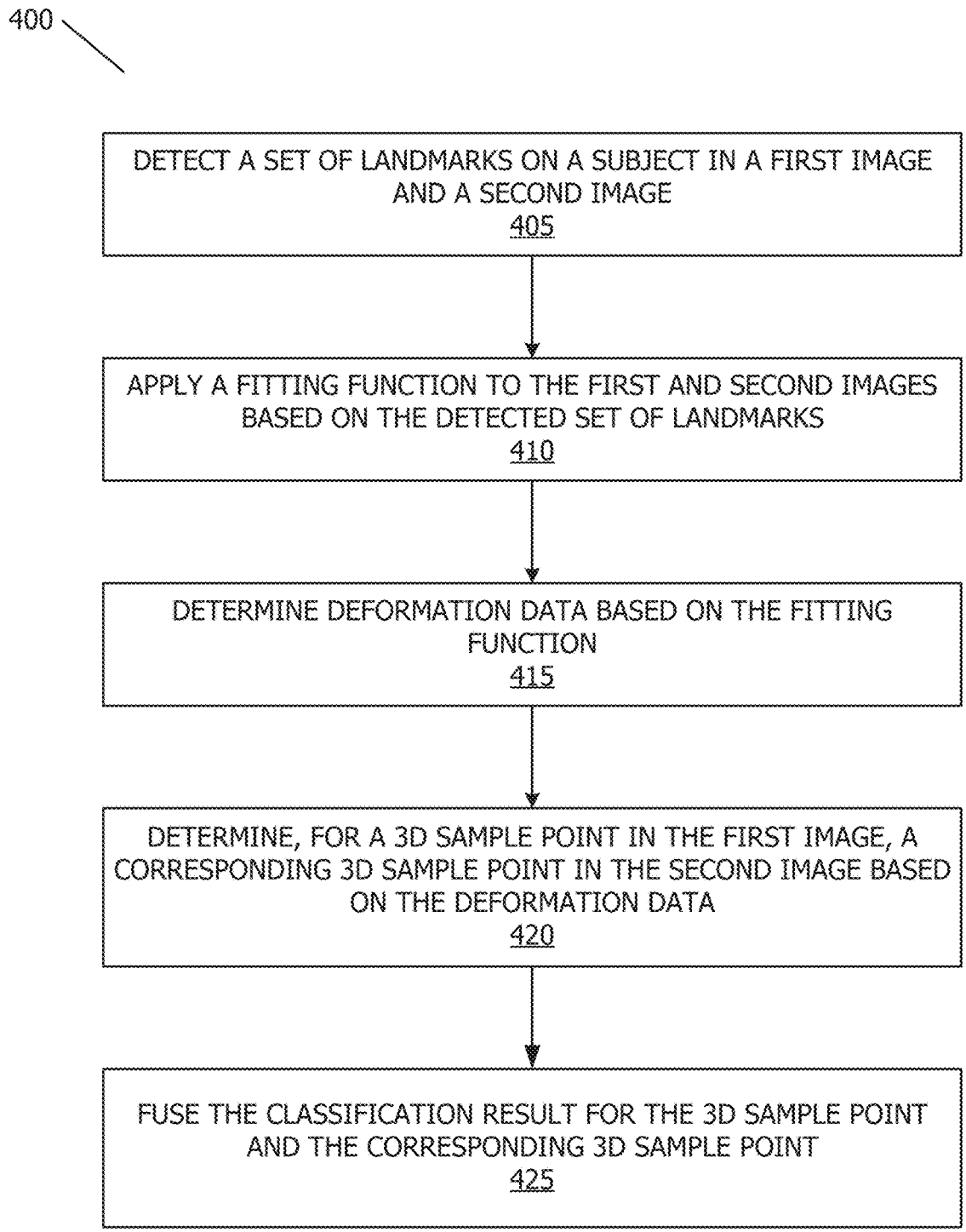
FIG. 4 shows a flowchart of a technique for determining correspondences in a set of images, in accordance with some embodiments.

FIG. 4 shows a flowchart of a technique for determining correspondences in a set of images, in accordance with some embodiments. For purposes of explanation, the following steps will be described in the context of FIG. 1. However, it should be understood that the various actions may be performed by alternate components. In addition, the various actions may be performed in a different order. Further, some actions may be performed simultaneously, and some may not be required, or others may be added.

The flowchart 400 begins at block 405 where a set of landmarks are detected on a subject in a first image and a second image. Landmarks may be determined based on identifiable points on the surface of the object. The landmarks may be detected, for example, by applying the images to a feature detector algorithm, or the like.

The flowchart 400 continues at block 410 where a fitting function is applied to the first and second images based on the detected set of landmarks. In doing so, an iterative process is performed to determine a representation of the landmark points across the first and second images. In some embodiments, the result is, at block 415, deformation data may be determined based on the fitting function. In some embodiments, the deformation data may indicate, for a landmark point, 12 degrees of freedom for indicating the transformation from the source image to the additional image of the input images.

The flowchart 400 continues at block 420 where, for a 3D sample point in the first image, a corresponding 3D sample point in the second image is determined based on the deformation data. As described above, the deformation data may indicate how points from two images are spatially related. Thus, a given point in one image can be projected into the other image to predict the location of that point in the second image. As such, the deformation data can be used to identify, for a given 3D sample point in one image, a corresponding 3D sample point in another image.

The flowchart 400 concludes at block 425 where the classification results for the 3D sample points are fused. For example, the 3D sample point from a first input image may be associated with a particular classification value. That classification value can be improved by considering the classification value for a corresponding 3D point determined from a different input image 104. However, in order to identify correspondences of 3D sample points across the images, the deformation data may be considered. As such, the fusion network 124 can take the deformation data 122 and the classification values from classification network 118 to determine a set of classification values for a 3D space representative of the 3D sample points.

Figure 5:
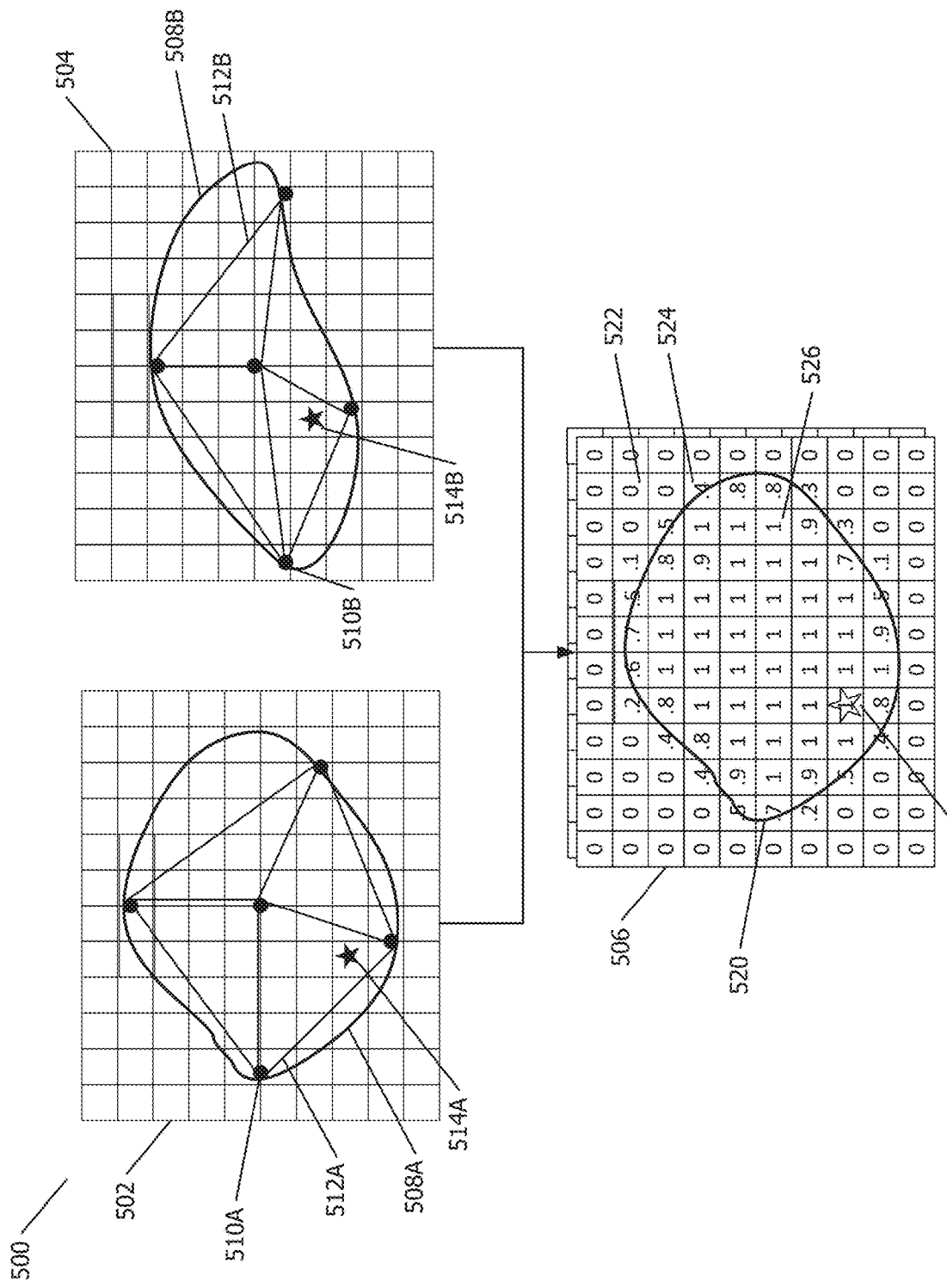
FIG. 5 shows an example diagram of a classification, according to some embodiments.

Turning to FIG. 5, a flow diagram is presented depicting a fused classification value for a given 3D sample point.

Specifically, flow diagram 500 depicts a first image representation 502 and a second image representation 504. Specifically, the first image representation 502 shows a 2D representation of an outline 508A of a subject of the image. As described above, in some embodiments, the image may be applied to a deformation network to identify a set of landmarks, such as landmark 510A in the image. The relationship of the set of landmarks is presented as a deformation graph 512A.

Similarly, the second image representation 504 shows a 2D representation of an outline 508B of the same subject as depicted in image representation 502, but in a different pose, such as an end pose resulting from user movement between the capture of the first image representation and the second image representation. As such, the 2D outline 508B for the subject of the image appears to be stretched when compared to outline 508A of image representation 502. As described above, in some embodiments, the image may be applied to a deformation network to identify a set of landmarks, such as landmark 510B in the image. The relationship of the set of landmarks is presented as a deformation graph 512B.

In some embodiments, although not depicted, classification values can be determined for 3D sample points for each of the input images, such as those represented by 502 and 504. A set of fused classification values for a 3D representation of the subject may be determined by fusing the classification values determined from each input image corresponding to 502 and 504. According to some embodiments, fusing the classification values involves identifying corresponding 3D sample points across the images. As such, deformation data can be determined for a set of images to represent a displacement of a landmark point from one image and a landmark point from another image. In the example of FIG. 5, deformation data may represent the projection of points from the first deformation graph 512A to the second deformation graph 512B. As such, for a given 3D sample point represented by 514A a corresponding sample point 514B can be determined in image represented by 504 based on the deformation data.

As shown at 506, a set of fused classification values can be determined for 3D space representative of the subject presented in images 502 and 504. Although the representation 506 is depicted in two dimensions, it should be understood that in practice, the representation 506 would include values in three dimensions. As such, the representation shown at 506 can be considered a cross section of the actual three dimensional representation and the full set of fused classification values. For purposes of this example, a value closer to 0 indicates that a sample 3D point is predicted to be outside the volume of the subject, as shown at sample point 522. By contrast, a value closer to 1 indicates that a sample 3D point is predicted to be inside the volume of the subject, as shown at sample point 526. In addition, values may be assigned between 0-1 indicative of a weight at which the sample point is predicted to be inside or outside. As such, example sample point 524 is shown to have a value of 0.4 because it is closely aligned to a boundary of the volume of the surface. These fused classification values may be determined, for example, by determining a set of classification values for each of the input images 502 and 504, and the correspondences between sample points derived from the two images represented by deformation data. In this example, 3D sample point 514A may be located in the first representation 502, and can be determined to correspond to 3D sample point 514B derived from the second image 504. The classification values corresponding to these two points can be combined during the fusing process to obtain a fused classification value for the 3D sample point for the subject. As such, sample point 528 shows the fused classification value of 1 for the subject, meaning that 3D sample point is predicted to be inside the volume of the subject.

From the fused classification values, a 3D occupation field can be determined based on the boundary of sample points predicted to be inside the volume and sample points predicted to be outside the volume. As such, for purposes of the example, the outline 520 indicates a determined boundary of the 3D occupation field for the subject represented in the images.

Figure 6:
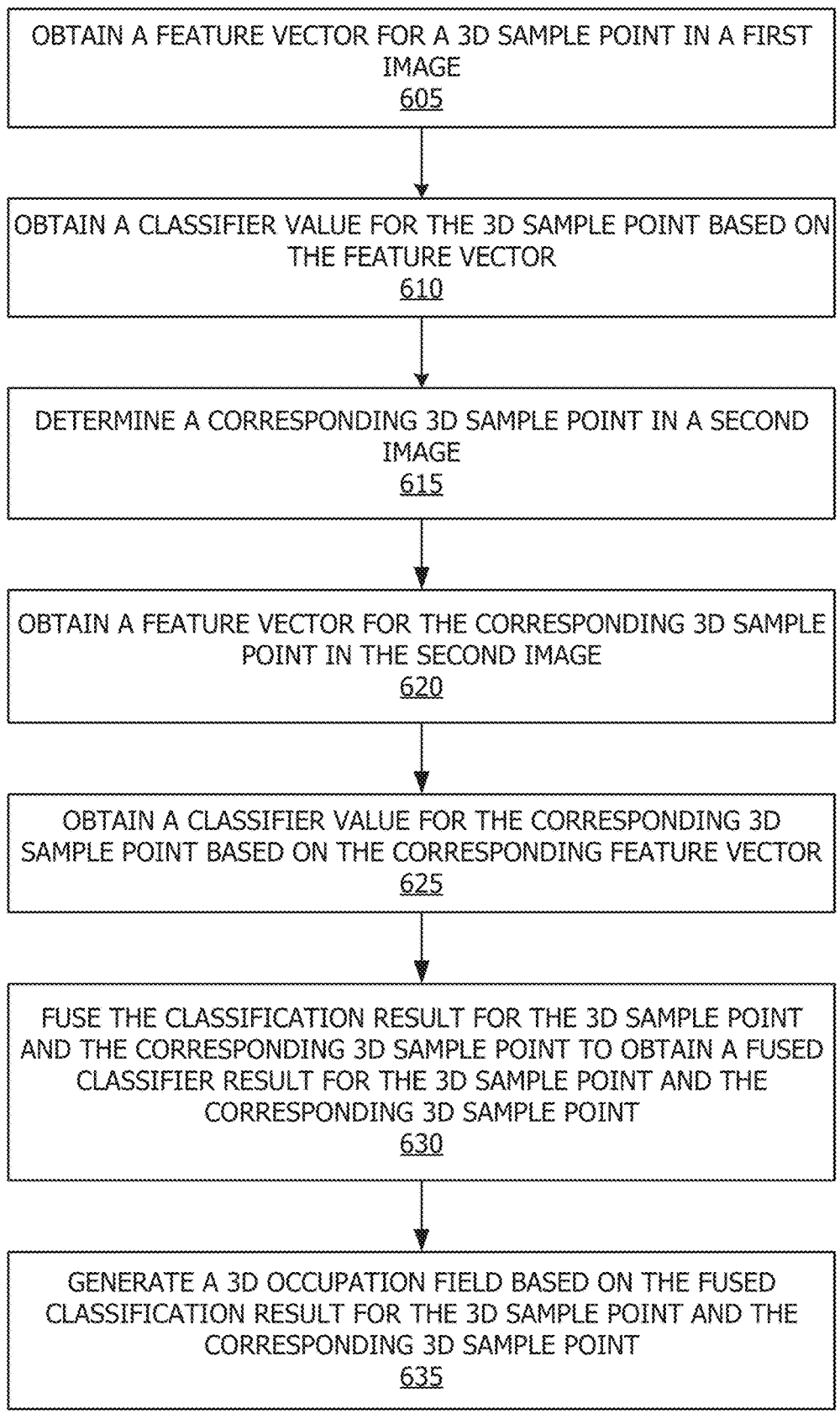
FIG. 6 shows a flowchart of a technique for fusing classification results, according to some embodiments.

FIG. 6 shows a flowchart of a technique for fusing classification results, according to some embodiments. For purposes of explanation, the following steps will be described in the context of FIG. 1. However, it should be understood that the various actions may be performed by alternate components. In addition, the various actions may be performed in a different order. Further, some actions may be performed simultaneously, and some may not be required, or others may be added.

The flowchart 600 begins at block 605 where a feature vector is obtained for a 3D sample point in a first image. Referring back to FIG. 1, feature vector module 114 determined the X, Y coordinates 108 for the 3D sample point, and extracts the features 112 from each input image related to those coordinates. The feature vector may be obtained from a feature grid including, for each feature point in the image, a vector representation of the feature. Thus, the feature vector can be extracted from the grid according to the X, Y values of the 3D sample point.

The flowchart 600 continues at 610 and a classifier value is obtained for the 3D sample point based on the feature vector. In some embodiments, the classifier value may be obtained from a classifier network trained to predict a spatial relationship of a particular 3D point to the volume of a subject presented in the images. The classifier network may be configured to make the prediction based on an input vector which may be based on the extracted features and the sample 3D point. For example, in some embodiments, the input vector may include, for each sample 3D point from each image, the feature vector extracted from the image, along with a depth value. The classification value provided by the classification network may be, for example, a value between 0-1, where values closer to 1 indicate that the point is predicted to be inside the volume of the subject, whereas values closer to 0 indicate that the point is predicted to be outside the volume of the surface. As such, a set of classification values can be obtained for a set of 3D points in space representative of the subject of the input image, even if the input image is a 2D image.

At block 615, a corresponding 3D sample point is determined in an additional image for each of the 3D sample points. That is, in order to determine 3D information from the 2D images in an improved manner, correspondences among the feature points may be determined. As described above, for a given 3D sample point, deformation data may be used for the images to determine a corresponding 3D sample point in an additional image. In some embodiments, the deformation data may be in the form of a deformation function which indicates an offset of feature points from one image to another. As such, the deformation function may provide a predicted location of a corresponding point in a second image. In some embodiments, the deformation function may provide a predicted location of a corresponding 3D sample point in a 3D space derived from the second image.

The flowchart 600 continues at block 620, where a feature vector for the corresponding sample point is obtained based on the second image. That is, the feature vector module 114 may identify the feature vector for the corresponding pixel in the second image for a given 3D sample point. Because of the movement of the subject and/or the camera pose as the input images are captured, the coordinates for the corresponding features will be different and, thus, the deformation data is used to identify the correspondences across the images. At block 625, a classifier value is obtained for the corresponding 3D sample point for the second image. As described above, the classifier network may be configured to make the prediction based on an input vector which may be based on the extracted features and the sample 3D point. Thus, an input vector corresponding to the feature vector obtained at block 620 may be applied to the classifier network to obtain the classifier value for the corresponding 3D sample point.

Turning to block 630, the classification result for the 3D sample point, determined at 610, and the corresponding 3D sample point, determined at 625, are fused to obtain a fused classifier result for a 3D sample point. For example, the classifier values for each of the corresponding pixels can be combined or otherwise considered to obtain a single value. The classifier values may be combined in any number of ways. For example, the values may be averaged, or weighted against each other based on various parameters related to the image, the capture of the image, and/or content in the image.

The flowchart 600 concludes at block 635, where a 3D occupation field is determined based on the fused classification values. For example, the set of fused classification values may be analyzed to recover a surface of the 3D subject presented in the input images. In some embodiments, this 3D occupation field may then be used for generating representations of the user, such as avatar representations of the user. In some embodiments, the 3D occupation field may be used for generating representations of part of the user or accessories for the user, such as hair or headwear. According to some embodiments, a surface of the subject can be reconstructed from the 3D occupation field, for example in the form of a 3D mesh or other geometric representation of the subject. Then the 3D representation can be stored, for example as enrollment data, for later use in rendering an avatar or other graphical representation of the subject.

Figure 7:
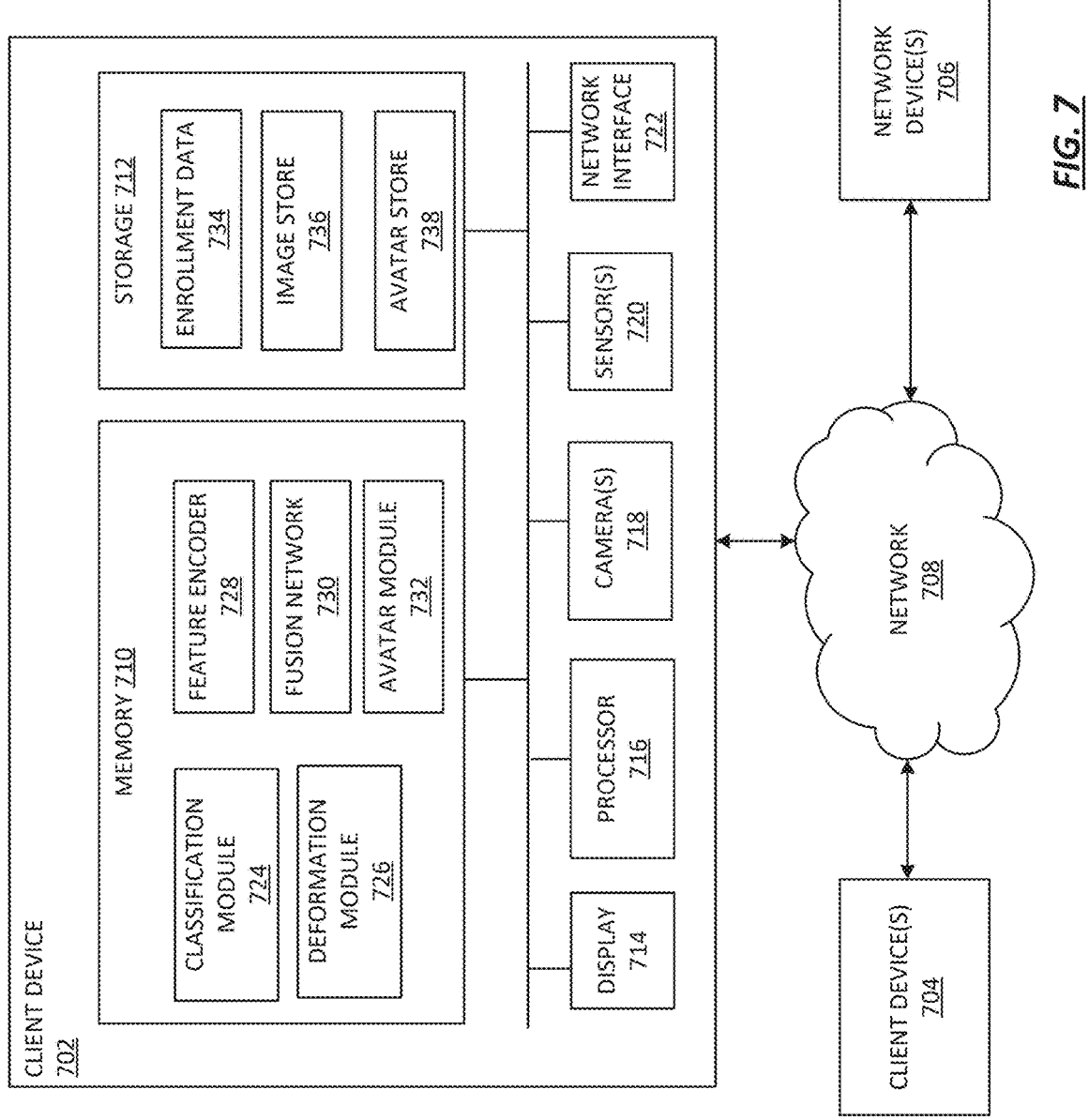
FIG. 7 shows, in block diagram form, a simplified system diagram according to one or more embodiments.

Referring to FIG. 7, a simplified network diagram 700 of a client device 702 which may be utilized to generate a three dimensional representation of a subject in an environment. The network diagram 700 includes client device 702 which may include various components. Client device 702 may be part of a multifunctional device, such as a phone, tablet computer, personal digital assistant, portable music/video player, wearable device, head mounted device, base station, laptop computer, desktop computer, mobile device, network device, or any other electronic device that has the ability to capture image data.

Client device 702 may include one or more processors 716, such as a central processing unit (CPU). Processor(s) 716 may include a system-on-chip such as those found in mobile devices and include one or more dedicated graphics processing units (GPUs). Further, processor(s) 716 may include multiple processors of the same or different type. Client device 702 may also include a memory 710. Memory 710 may include one or more different types of memory, which may be used for performing device functions in conjunction with processor(s) 716. Memory 710 may store various programming modules for execution by processor(s) 716, including classification module 724, deformation module 726, feature encoder 728, fusion network 730, avatar module 732, and potentially other various applications.

Client device 702 may also include storage 712. Storage 712 may include enrollment data 734, which may include data regarding user-specific profile information, user-specific preferences, and the like. Storage 712 may also include an image store 736. Image store 736 may be used to store a series of images from which enrollment data can be determined, such as the input images described above from which three dimensional information can be determine for a subject in the images. Storage 712 may also include an avatar store 738, which may store data used to generate graphical representations of user movement, such as geographic data, texture data, predefined characters, and the like.

In one or more embodiments, the classification module 724 may be configured to determine, for a given set of 3D sample points, a classification of the point with respect to a volume of the subject captured in the images. As described above, the classification module may use an input vector, which may be based in part on a feature vector extracted from an input image and generated from a feature encoder 728, and a depth coordinate of a 3D sample point to predict a relative position of the 3D sample point to a volume of a subject in the input image.

The deformation module 726 may be configured to determine deformation data for a set of input images. For example, for a pair of input images, the deformation module 726 may be configured to identify landmarks in the input images, and determine a displacement of the landmark points from one image to the other. As such, in some embodiments, the deformation module 726 may provide a deformation function that allows a particular point in one image to be projected into the second image such that a corresponding point in the second image can be identified. The fusion network 730 is configured to fuse the classification results from corresponding 3D sample points to obtain a set of fused classification results. The fused classification results can then be used to determine a 3D occupation field, from which a surface geometry can be recovered. That surface geometry may be represented in the form of 3D geometric information, such as a mesh representation. In some embodiments, the surface geometry is stored, for example in avatar store 738, for use by avatar module 732 for generating and/or providing avatar data representative of a user of client device 702 to other devices across network 708 via network interface 722, such as client device(s) 704. Further, in some embodiments, the surface geometry may be stored by one or more network device(s) 706 for use by client device 702 or other devices communicably connected across the network 708 for generating an avatar representation of the user of client device 702.

In some embodiments, the client device 702 may include other components utilized for user enrollment, such as one or more cameras 718 and/or other sensors 720, such as one or more depth sensors. In one or more embodiments, each of the one or more cameras 718 may be a traditional RGB camera, a depth camera, or the like. The one or more cameras 718 may capture input images of a subject for determining 3D information from 2D images. Further, cameras 718 may include a stereo or other multicamera system.

Although client device 702 is depicted as comprising the numerous components described above, and one or more embodiments, the various components and functionality of the components may be distributed differently across one or more additional devices, for example across a network. For example, in some embodiments, any combination of storage 712 may be partially or fully deployed on additional devices, such as network device(s) 706, or the like.

Further, in one or more embodiments, client device 702 may be comprised of multiple devices in the form of an electronic system. For example, input images may be captured from cameras on accessory devices communicably connected to the client device 702 across network 708, or a local network As another example, some or all of the computational functions described as being performed by computer code in memory 710 may be offloaded to an accessory device communicably coupled to the client device 702, a network device such as a server, or the like. Accordingly, although certain calls and transmissions are described herein with respect to the particular systems as depicted, in one or more embodiments, the various calls and transmissions may be differently directed based on the differently distributed functionality. Further, additional components may be used, or some combination of the functionality of any of the components may be combined.

Figure 8:
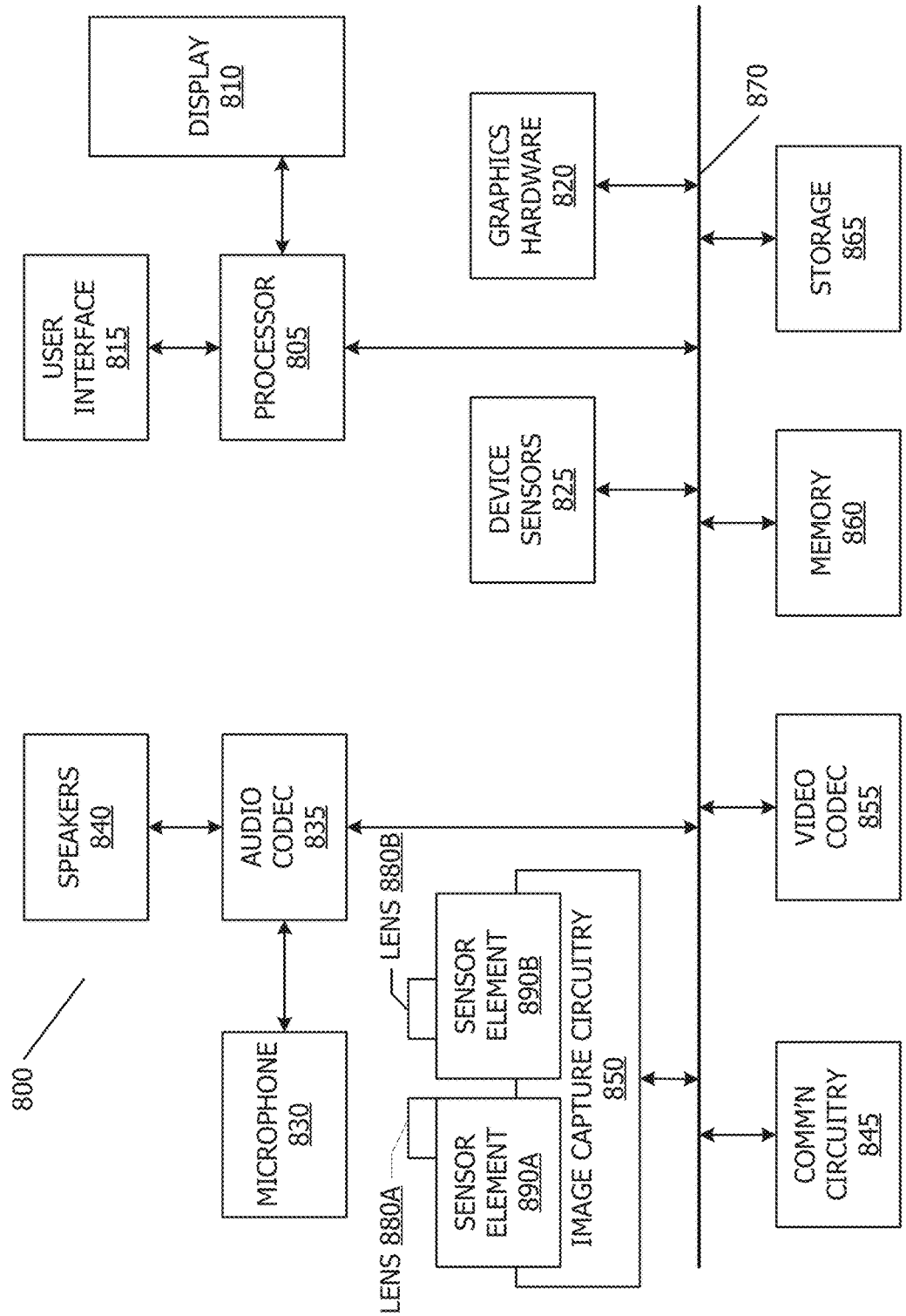
FIG. 8 shows, in block diagram form, a computer system in accordance with one or more embodiments.

Referring now to FIG. 8, a simplified functional block diagram of illustrative multifunction electronic device 800 is shown according to one embodiment. Each of the electronic devices may be a multifunctional electronic device or may have some or all of the described components of a multifunctional electronic device described herein. Multifunction electronic device 800 may include some combination of processor 805, display 810, user interface 815, graphics hardware 820, device sensors 825 (e.g., proximity sensor/ambient light sensor, accelerometer and/or gyroscope), microphone 830, audio codec 835, speaker(s) 840, communications circuitry 845, digital image capture circuitry 850 (e.g., including camera system), memory 860, storage device 865, and communications bus 870. Multifunction electronic device 800 may be, for example, a mobile telephone, personal music player, wearable device, tablet computer, and the like.

Processor 805 may execute instructions necessary to carry out or control the operation of many functions performed by device 800. Processor 805 may, for instance, drive display 810 and receive user input from user interface 815. User interface 815 may allow a user to interact with device 800. For example, user interface 815 can take a variety of forms, such as a button, keypad, dial, a click wheel, keyboard, display screen, touch screen, and the like. Processor 805 may also, for example, be a system-on-chip such as those found in mobile devices and include a dedicated GPU. Processor 805 may be based on reduced instruction-set computer (RISC) or complex instruction-set computer (CISC) architectures or any other suitable architecture and may include one or more processing cores. Graphics hardware 820 may be special purpose computational hardware for processing graphics and/or assisting processor 805 to process graphics information. In one embodiment, graphics hardware 820 may include a programmable GPU.

Image capture circuitry 850 may include one or more lens assemblies, such as 880A and 880B. The lens assemblies may have a combination of various characteristics, such as differing focal length and the like. For example, lens assembly 880A may have a short focal length relative to the focal length of lens assembly 880B. Each lens assembly may have a separate associated sensor element 890. Alternatively, two or more lens assemblies may share a common sensor element. Image capture circuitry 850 may capture still images, video images, enhanced images, and the like. Output from image capture circuitry 850 may be processed, at least in part, by video codec(s) 855 and/or processor 805 and/or graphics hardware 820, and/or a dedicated image processing unit or pipeline incorporated within circuitry 845. Images so captured may be stored in memory 860 and/or storage 865.

Memory 860 may include one or more different types of media used by processor 805 and graphics hardware 820 to perform device functions. For example, memory 860 may include memory cache, read-only memory (ROM), and/or random access memory (RAM). Storage 865 may store media (e.g., audio, image and video files), computer program instructions or software, preference information, device profile information, and any other suitable data. Storage 865 may include one more non-transitory computer-readable storage mediums, including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 860 and storage 865 may be used to tangibly retain computer program instructions or computer readable code organized into one or more modules and written in any desired computer programming language. When executed by, for example, processor 805, such computer program code may implement one or more of the methods described herein.

A physical environment refers to a physical world that people can sense and/or interact with without aid of electronic devices. The physical environment may include physical features such as a physical surface or a physical object. For example, the physical environment corresponds to a physical park that includes physical trees, physical buildings, and physical people. People can directly sense and/or interact with the physical environment such as through sight, touch, hearing, taste, and smell. In contrast, an XR environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and in response, one or more characteristics of one or more virtual objects simulated in the XR environment are adjusted in a manner that comports with at least one law of physics. As one example, the XR system may detect head movement and, in response, adjust graphical content and an acoustic field presented to the person in a manner similar to how such views and sounds would change in a physical environment. As another example, the XR system may detect movement of the electronic device presenting the XR environment (e.g., a mobile phone, a tablet, a laptop, or the like) and, in response, adjust graphical content and an acoustic field presented to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

It is to be understood that the above description is intended to be illustrative and not restrictive. The material has been presented to enable any person skilled in the art to make and use the disclosed subject matter as claimed and is provided in the context of particular embodiments, variations of which will be readily apparent to those skilled in the art (e.g., some of the disclosed embodiments may be used in combination with each other). Accordingly, the specific arrangement of steps or actions shown in FIGS. 2, 4 and 6 or the arrangement of elements shown in FIGS. 1, 3, 5, and 7-8 should not be construed as limiting the scope of the disclosed subject matter. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A method comprising:
   obtaining a plurality of images of a subject;
   obtaining, for a sample point, a classifier value for each of the plurality of images, wherein the classifier value indicates a relationship of the sample point to a volume corresponding to the subject;
   determining deformation data associated with the subject in the plurality of images;
   fusing the classifier value for each of the plurality of images in accordance with the deformation data; and
   determining a 3D occupation field for the subject based on the fused classifier values.

2. The method of claim 1, wherein determining the deformation data comprises:
   detecting a set of landmark points in a first image and a second image of the plurality of images; and
   determining a deformation graph, wherein the deformation graph indicates a relative position of each of the set of landmark points from the first image to the second image,
   wherein the deformation data is obtained from the deformation graph.

3. The method of claim 1, wherein fusing the classifier value for each of the plurality of images comprises:
   projecting the sample point for each of the plurality of images in accordance with the deformation data to determine a projected sample point for each of the images; and
   determining a feature vector for each of the projected sample points for each of the images.

4. The method of claim 3, further comprising:
   extracting the feature vector from a feature grid based on the projected sample point for each of the images.

5. The method of claim 4, wherein the feature grid is obtained from a trained network configured to generate a feature set for an input image.

6. The method of claim 3, wherein the classifier value is obtained from a classifier network trained to predict the relationship of the sample point to the volume corresponding to the subject based on an input vector, wherein the input vector comprises a vector based on the feature vector and a depth value for a corresponding sample point.

7. A non-transitory computer readable medium comprising computer readable code executable by one or more processors to:
   obtain a plurality of images of a subject;
   obtain, for a sample point, a classifier value for each of the plurality of images, wherein the classifier value indicates a relationship of the sample point to a volume corresponding to the subject;
   determine deformation data associated with the subject in the plurality of images;
   fuse the classifier value for each of the plurality of images in accordance with the deformation data; and
   determine a 3D occupation field for the subject based on the fused classifier values.

8. The non-transitory computer readable medium of claim 7, wherein the computer readable code to determine the deformation data comprises computer readable code to:
   detecting a set of landmark points in a first image and a second image of the plurality of images; and
   determining a deformation graph, wherein the deformation graph indicates a relative position of each of the set of landmark points from the first image to the second image,
   wherein the deformation data is obtained from the deformation graph.

9. The non-transitory computer readable medium of claim 7, wherein the computer readable code to fuse the classifier value for each of the plurality of images comprises computer readable code to:
   project the sample point for each of the plurality of images in accordance with the deformation data to determine a projected sample point for each of the images; and
   determine a feature vector for each of the projected sample points for each of the images.

10. The non-transitory computer readable medium of claim 7, further comprising computer readable code to:
    generate an avatar of the subject based on the 3D occupation field.

11. The non-transitory computer readable medium of claim 10, wherein the 3D occupation field is used to render at least one of hair and headwear for the subject.

12. The non-transitory computer readable medium of claim 7, wherein the plurality of images comprises a set of still image frames, and wherein each of the plurality of images capturing the subject performing a unique pose.

13. A system comprising:
    one or more processors; and
    one or more computer readable media comprising computer readable code executable by the one or more processors to:
    obtain a plurality of images of a subject;
    obtain, for a sample point, a classifier value for each of the plurality of images, wherein the classifier value indicates a relationship of the sample point to a volume corresponding to the subject;
    determine deformation data associated with the subject in the plurality of images;
    fuse the classifier value for each of the plurality of images in accordance with the deformation data; and
    determine a 3D occupation field for the subject based on the fused classifier values.

14. The system of claim 13, wherein the computer readable code to determine the deformation data comprises computer readable code to:
    detecting a set of landmark points in a first image and a second image of the plurality of images; and
    determining a deformation graph, wherein the deformation graph indicates a relative position of each of the set of landmark points from the first image to the second image,
    wherein the deformation data is obtained from the deformation graph.

15. The system of claim 13, wherein the computer readable code to fuse the classifier value for each of the plurality of images comprises computer readable code to:
    project the sample point for each of the plurality of images in accordance with the deformation data to determine a projected sample point for each of the images; and
    determine a feature vector for each of the projected sample points for each of the images.

16. The system of claim 15, further comprising computer readable code to:
    extract the feature vector from a feature grid based on the projected sample point for each of the images.

17. The system of claim 16, wherein the feature grid is obtained from a trained network configured to generate a feature set for an input image.

18. The system of claim 15, wherein the classifier value is obtained from a classifier network trained to predict the relationship of the sample point to the volume corresponding to the subject based on an input vector, wherein the input vector comprises a vector based on the feature vector and a depth value for a corresponding sample point.

19. The system of claim 13, further comprising computer readable code to:
  generate an avatar of the subject based on the 3D occupation field.

20. The system of claim 19, wherein the 3D occupation field is used to render at least one of hair and headwear for the subject.

* * * * *